(12) United States Patent
Taylor

(10) Patent No.: US 9,522,816 B2
(45) Date of Patent: Dec. 20, 2016

(54) APPARATUS AND METHOD FOR MOVING CATALYST BINS

(71) Applicant: Kenneth Taylor, Glendale, AZ (US)

(72) Inventor: Kenneth Taylor, Glendale, AZ (US)

( * ) Notice: Subject to any disclaimer, the term of this patent is extended or adjusted under 35 U.S.C. 154(b) by 58 days.

(21) Appl. No.: 14/704,454

(22) Filed: May 5, 2015

(65) Prior Publication Data
US 2016/0325972 A1   Nov. 10, 2016

(51) Int. Cl.
*B66F 9/06* (2006.01)
*B66F 9/065* (2006.01)
*B66F 9/075* (2006.01)
*B60B 33/00* (2006.01)

(52) U.S. Cl.
CPC ........... *B66F 9/065* (2013.01); *B60B 33/0002* (2013.01); *B66F 9/0655* (2013.01); *B66F 9/07504* (2013.01); *B66F 9/07563* (2013.01)

(58) Field of Classification Search
CPC ....... B66F 9/06; B66F 9/0655; B66F 9/07563; B66F 9/07504
See application file for complete search history.

(56) References Cited

U.S. PATENT DOCUMENTS

| | | | |
|---|---|---|---|
| 2,550,548 A * | 4/1951 | Framhein | B62B 3/06 254/10 C |
| 2,974,917 A | 3/1961 | Kappen | |
| 3,265,158 A * | 8/1966 | Constable | B62B 3/0612 187/232 |
| 3,318,473 A * | 5/1967 | Jones | B65D 88/26 108/55.1 |
| 3,421,775 A * | 1/1969 | Dugelay | B62B 3/0618 280/43.12 |
| 3,602,400 A * | 8/1971 | Cooke | B65D 88/128 222/143 |
| 3,971,486 A * | 7/1976 | Carlsson | B66F 9/06 414/493 |
| 4,027,771 A * | 6/1977 | Adams | B62B 3/0625 280/43.12 |
| 4,201,511 A * | 5/1980 | Charles | B66F 9/0655 294/81.1 |
| 4,632,630 A * | 12/1986 | Maki | B66F 9/0655 414/671 |

(Continued)

OTHER PUBLICATIONS

"Pallet Jack", Item 68760/68761, Instructions and Precautions, HaulMaster, 2011, pp. 1-12.

(Continued)

*Primary Examiner* — Erez Gurari
(74) *Attorney, Agent, or Firm* — Cahill Glazer PLC

(57) ABSTRACT

Apparatus for moving catalyst containers includes a lifting jack having first and second legs each supporting a roller, and each having a relatively short length to avoid contact with the discharge hopper of the container. First and second idler rollers are inserted under one end of the container base. A load plate of the lifting jack is engaged with the second end of the container base, and raised, allowing the container to be moved. The load plate is rotatably supported by a support plate positioned between the legs of the lifting jack. In use, a first end of the base is raised, the idler rollers are inserted, the first end is lowered, the lifting jack is inserted into the second end of the base, and raised to permit transport of the container.

12 Claims, 6 Drawing Sheets

(56) References Cited

U.S. PATENT DOCUMENTS

| | | | | | |
|---|---|---|---|---|---|
| 4,662,669 | A | * | 5/1987 | Erickson | B01J 8/0015 |
| | | | | | 206/596 |
| 4,715,765 | A | * | 12/1987 | Agnoff | B65G 1/08 |
| | | | | | 211/151 |
| 4,722,511 | A | * | 2/1988 | Chitwood | B62B 3/0625 |
| | | | | | 254/134 |
| 4,810,151 | A | * | 3/1989 | Shern | B62B 3/108 |
| | | | | | 269/17 |
| 5,036,952 | A | * | 8/1991 | Harper | B66F 9/06 |
| | | | | | 187/222 |
| 5,143,180 | A | * | 9/1992 | Harper | B66F 9/06 |
| | | | | | 187/229 |
| 5,249,908 | A | | 10/1993 | Tsai | |
| 5,328,321 | A | * | 7/1994 | Moffett | B60K 17/10 |
| | | | | | 187/226 |
| 5,344,278 | A | * | 9/1994 | Emig, Jr. | B62B 3/04 |
| | | | | | 294/119.2 |
| 5,354,080 | A | * | 10/1994 | Jones | B62B 3/0612 |
| | | | | | 254/2 C |
| 5,374,151 | A | | 12/1994 | Matthews | |
| 5,385,233 | A | * | 1/1995 | McKibben | B65D 7/045 |
| | | | | | 108/57.13 |
| D363,209 | S | * | 10/1995 | Murphy | D8/375 |
| 5,480,275 | A | * | 1/1996 | Talbert | B66F 9/07559 |
| | | | | | 187/226 |
| 5,531,360 | A | * | 7/1996 | Berdel | B65B 69/0091 |
| | | | | | 206/386 |
| 5,549,437 | A | * | 8/1996 | Kishi | B66F 9/07563 |
| | | | | | 280/766.1 |
| 5,788,452 | A | * | 8/1998 | Brouwer | B66F 9/07563 |
| | | | | | 187/222 |
| 6,065,926 | A | * | 5/2000 | Knapp | B66F 9/12 |
| | | | | | 414/607 |
| 6,125,971 | A | * | 10/2000 | Niebuhr | B66F 9/07504 |
| | | | | | 187/222 |
| 6,260,646 | B1 | * | 7/2001 | Fernandez | B62B 3/0612 |
| | | | | | 180/12 |
| 6,299,008 | B1 | | 10/2001 | Payne | |
| 6,328,183 | B1 | * | 12/2001 | Coleman | B65D 88/128 |
| | | | | | 222/185.1 |
| 6,450,515 | B1 | * | 9/2002 | Guth | B60B 33/0063 |
| | | | | | 16/30 |
| 6,530,739 | B1 | * | 3/2003 | Fridman | B66F 9/07563 |
| | | | | | 414/462 |
| 7,482,928 | B2 | | 1/2009 | Brackmann et al. | |
| 7,524,159 | B2 | * | 4/2009 | Mammone | B65F 1/1468 |
| | | | | | 414/812 |
| 7,641,011 | B2 | * | 1/2010 | Fridlington, Jr. | B62B 3/0618 |
| | | | | | 180/68.5 |
| 8,336,913 | B1 | * | 12/2012 | Aaseby | B60B 11/02 |
| | | | | | 280/38 |
| 8,505,780 | B2 | * | 8/2013 | Oren | B65D 88/32 |
| | | | | | 220/601 |
| 8,887,914 | B2 | * | 11/2014 | Allegretti | B65D 19/06 |
| | | | | | 108/51.11 |
| 8,950,759 | B2 | * | 2/2015 | Thorsen | B62B 3/02 |
| | | | | | 280/43.12 |
| 8,979,099 | B1 | * | 3/2015 | Ellis | B66F 9/142 |
| | | | | | 280/43.12 |
| 2004/0118725 | A1 | * | 6/2004 | Shuert | B65D 19/0028 |
| | | | | | 206/386 |
| 2009/0189132 | A1 | | 7/2009 | Meijer et al. | |
| 2012/0080858 | A1 | * | 4/2012 | Larringan Errasti | B62B 3/06 |
| | | | | | 280/43.12 |
| 2012/0273387 | A1 | * | 11/2012 | Ivosevic | B65D 71/0088 |
| | | | | | 206/597 |
| 2013/0121800 | A1 | | 5/2013 | Hacko et al. | |

OTHER PUBLICATIONS

"5500-Lb. Pallet Truck Owners Manual", Item # 35001, Roughneck, 9 pages.

* cited by examiner

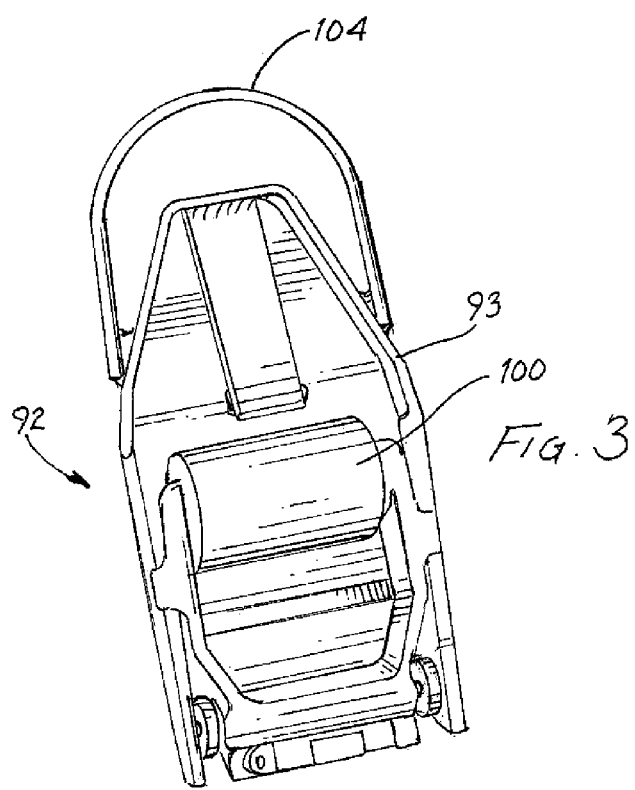
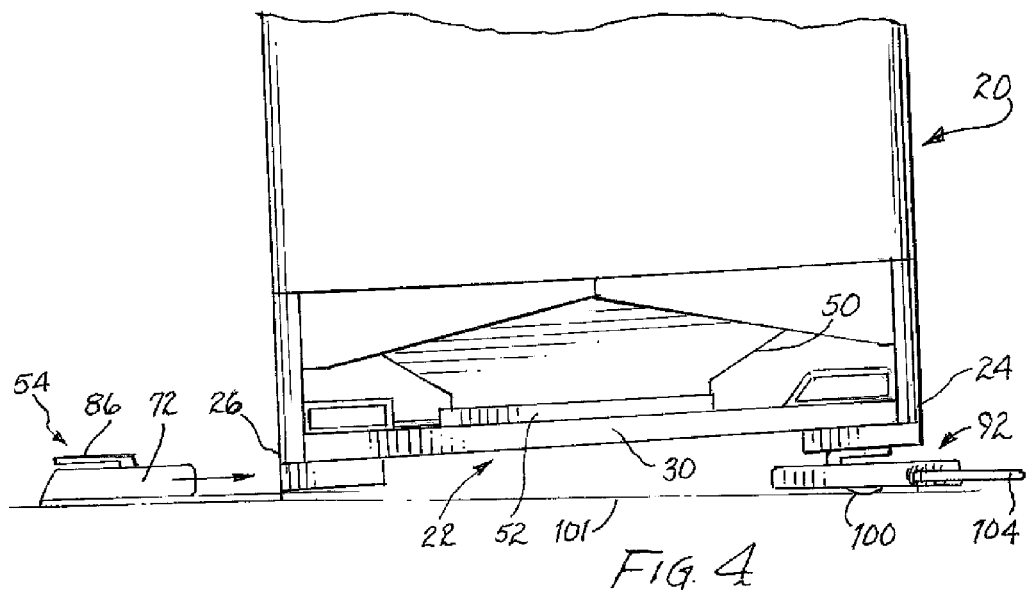

APPARATUS AND METHOD FOR MOVING CATALYST BINS

BACKGROUND OF THE INVENTION

1. Field of the Invention

The present invention relates generally to apparatus and methods for moving containers, and more particularly, to an apparatus and method for adapted to move loaded catalyst bins within relatively close quarters.

2. Description of the Relevant Art

In the chemical and petrochemical industry, catalysts are often used to help process hydrocarbons like gas an oil. For example, catalysts are often used to accelerate the "cracking" of heavy gas oil into diesel oils and gasoline and/or kerosene.

Recently, "fracking", or hydraulic fracturing, has been used to a greater degree to recover natural gas and oil from deep rock formations of spent wellbores. In fracking, a slurry of water, sand and chemicals are injected under high pressure into a wellbore to create small fractures through which gas and oil can escape to the surface. Fracking can make recovery of such resources economically feasible in cases where other known methods would be too costly. Oil and gas recovered via fracking can be processed using fluid catalytic cracking, wherein a heated catalyst breaks down large gas/oil molecules into less-complex molecules. Such catalysts are often supplied in the form of granular "beads".

After such catalyst beads have been used to process oil/gas mixtures, they are contaminated with hydrocarbon residue, and pose a safety and health risk. Spent hydrotreating catalysts are typically classified by the U.S. Environmental Protection Agency (EPA) as UN 3190, are regulated under dangerous goods class 4.2, and are listed as "hazardous wastes". Accordingly, used catalyst beads must be disposed of properly.

The most commonly used method is to load such catalyst beads into special catalyst bins or catalyst containers for transportation to a reclamation site. Catalyst bins have been available for many years; examples are found in U.S. Pat. No. 3,318,473 to Jones, et al.; and U.S. Pat. No. 4,662,669 to Erickson, et al. Several manufacturers supply such catalyst bins, including CHEP Technology Pty Limited of Sydney, Australia, and the Flo-Bin Rentals division of CCKX, Inc. of Houston, Tex. Such catalyst bins typically provide approximately 87 cubic feet of storage capacity. These catalyst bins are usually made of heavy gauge steel construction, and while they weigh only approximately 900 pounds when empty, they may weigh as much as 6,000 pounds or more when filled with spent catalyst beads. Such catalyst bins stand upright having a height of approximately 85 inches, and have a base measuring approximately 44 inches by 52 inches. The base of such catalyst bins typically incorporate steel skids having forklift ports for accepting the forks of a forklift. Centered between the forklift ports of the base is a discharge hopper, having a slidegate that can be opened when desired to discharge the contents of the catalyst bin. At the top of the catalyst bin, a drum-lid style fill port is provided for loading catalyst beads into the catalyst bin. Lifting lugs may also be provided at the top of the catalyst bin for using a crane to lift the catalyst bin.

Those skilled in the art should appreciate that, while such catalyst bins are often used to store contaminated catalyst beads, such catalyst bins may also be used to transport other materials, including minerals and even foodstuff. The terms "catalyst bin" and "catalyst container" are used herein to include the above-described catalyst bins whether they are used to store catalyst beads or other materials.

Applicable U.S. regulations regarding transportation of catalyst bins containing spent catalyst beads that have been used for petrochemical refining require a "double-containment" transport method. The catalyst bin serves as a first containment. When such catalyst bins are loaded within a non-refrigerated, enclosed, dry truck trailer, sufficient double-containment is achieved. Accordingly, catalyst bins are often loaded into such truck trailers for transportation within the United States.

As noted above, the base of such catalyst bins typically includes steel skids having forklift entry ports, and a common forklift is often used to elevate and load the catalyst bin onto the rear end of the truck trailer. Typical truck trailers can be used to transport 8-12 such catalyst bins at a time. However, once a catalyst bin has been loaded onto the rear end of the truck trailer by a forklift, final placement of each catalyst bin within the truck trailer is difficult, particularly due to the weight of loaded catalyst bins, and because the person or persons responsible for securing such catalyst bins within the truck trailer are working in relatively close quarters, particularly if one is trying to achieve relatively high packing density of catalyst bins within a truck trailer. Typically, there is not enough room on the truck trailer to efficiently maneuver a forklift in order to place a loaded catalyst bin in a desired final location on the truck trailer. The same issue is faced when the truck trailer has arrived at its destination, e.g., a catalyst reclamation treatment facility, and the catalyst bins must now be removed from the truck trailer.

Apart from hydraulic, gas-powered forklifts, so-called pallet jacks are also known in the art for transporting loads. For example, pallet trucks are available under the "Roughneck" brand from Northern Tool+Equipment Co., Inc. of Burnsville, Minn., and may be capable of lifting loads of approximately 5,500 pounds. However, the width of the spacing between the legs of such pallet trucks is only approximately 14.5 inches, while the fork length is approximately 48 inches. Were one to attempt to insert such a pallet jack into the base of a catalyst bin, the forks of the pallet jack would impact the discharge hopper of the catalyst bin, preventing the forks from being fully inserted, and risking damage to the discharge hopper, with the additional risk of catalyst bead leakage.

There are pallet jacks known in the art which allow for adjustment of the spacing between the fork prongs used to raise a pallet. For example, U.S. Pat. No. 7,641,011 to Fridlington, et al., discloses a pallet jack having width-adjustable fork prongs. However, the mechanism used to increase the spacing between the forks adds to the cost and complexity of the pallet jack. Moreover, even if the forks of a pallet jack could be separated by a sufficient distance to avoid impacting upon the discharge nozzle of a catalyst bin, most pallet jacks lack the lifting capacity to lift a fully-loaded catalyst bin. While some pallet jacks are capable of lifting and moving as much as 8,000 pounds, those pallet jacks are considerably more expensive than those designed to lift 5,500 pound loads.

Also known are pallet jacks having a pair of forks, each of which is adjustable in length; see, for example, U.S. Patent Application Publication No. US 2009/018932 A1 to Meijer, et al. However, even the shortest fork length illustrated by Meijer is not short enough to avoid damage to the discharge nozzle of a catalyst bin.

Incorporating permanently-deployed wheels or rollers within the catalyst bin itself is not a viable solution since such catalyst bins should not easily roll or otherwise move during transport.

Accordingly, it is an object of the present invention to provide an apparatus for efficiently moving and/or placing catalyst bins within tight quarters.

Another object of the present invention is to provide such an apparatus that can easily be operated by a single operator, even when moving fully-loaded catalyst bins.

Still another object of the present invention is to provide such an apparatus that will avoid the risk of damage to the discharge hopper of the catalyst bin.

Yet another object of the present invention is to provide such an apparatus which occupies very little space, but which is capable of supporting the weight of a fully-loaded catalyst bin.

An additional object of the present invention is to provide such an apparatus that facilitates steering of the catalyst bin toward a desired position during movement of the catalyst bin.

A further object of the present invention is to provide such an apparatus that is relatively inexpensive and generally easy to manufacture.

A still further object of the present invention is to provide a novel method of supporting fully-loaded catalyst bins for movement within confined quarters.

These and other objects of the invention will become more apparent to those skilled in the art as the description of the present invention proceeds.

SUMMARY OF THE INVENTION

Briefly described, and in accordance with a preferred embodiment thereof, the present invention provides an apparatus for moving catalyst bins in relatively close quarters, and including a lifting jack having first and second legs spaced from each other for extending into the base of a catalyst bin. The first and second legs each have a length that is shorter than the distance from either end of the catalyst bin base to the discharge hopper of the catalyst bin in order to avoid any contact between such legs and the discharge hopper.

Each of the legs of the lifting jack pivotally supports a load roller for allowing the leg to roll upon a cement floor, a truck trailer floor, or other support surface. The lifting jack also include a load-bearing surface for engaging an end of the catalyst container base so that it can be lifted. The lifting jack selectively raises or lowers the load-bearing surface, which in turn, raises or lowers an end of the catalyst bin.

In addition to the lifting jack, the apparatus of the present invention also includes first and second idler roller assemblies. Each idler roller assembly includes a support frame for engaging the base of the catalyst container and a load roller rotationally housed within the support frame.

In use, while a first end of the base of the catalyst bin is held in a raised position, the first and second idler roller assemblies can be inserted below the first end of the catalyst bin base, preferably proximate the opposing first and second sides of the first end of the catalyst bin base. The first end of the catalyst bin base can then be lowered for allowing the weight borne by the first end of the catalyst bin base to rest on the first and second idler roller assemblies. Incidentally, the initial raising of the first end of the catalyst bin base, for allowing insertion of the first and second idler roller assemblies, may be accomplished by a forklift used to load the catalyst bin onto the rear end of a truck trailer, as one example. Alternatively, the initial raising of the first end of the catalyst bin base, for allowing insertion of the first and second idler roller assemblies, may be accomplished by using the aforementioned lifting jack applied at the first end of the catalyst bin base, or by any other lifting mechanism.

After the first and second idler roller assemblies are inserted to support the first end of the catalyst bin base, the first and second legs of the lifting jack are inserted within the second end of the catalyst container base. The lifting jack is then actuated to raise the load-bearing surface of the lifting jack, which in turn raises the second end of catalyst bin base for rolling support upon the rollers of the lifting jack. The first and second ends of the catalyst bin base are now supported upon rollers, facilitating movement of the catalyst bin.

Preferably, the lifting jack includes a wheeled truck that supports a hydraulic jack. A handle is preferably pivotally mounted to the wheeled truck for actuating the hydraulic jack and for steering movement of the lifting jack. The lifting jack also preferably includes a lift frame coupled to the wheeled truck and hydraulic jack, whereby actuation of the hydraulic jack operates to elevate the lift frame, including the first and second legs and the load-bearing surface of the lifting jack, which in turn raises the end of catalyst bin base with which the lifting jack is engaged. Preferably, as is true for most pallet jacks, actuation of the hydraulic jack causes the first and second legs of the lift frame to be raised relative to their respective load rollers.

In the preferred embodiment, the load-bearing surface of the lifting jack includes a generally horizontal load plate which engages an end of the catalyst bin base. A generally horizontal support plate extends between the first and second legs of the lifting jack, and a bearing is supported by the horizontal support plate. The generally horizontal load plate is rotatably supported by the bearing for lifting an end of the catalyst bin base while allowing a user to rotate the lifting jack about a vertical axis even as the horizontal load plate and catalyst bin base remain motionless. The operator may thereby steer the lifting jack, as by pulling on the handle of the lifting jack toward a desired direction.

In most conventional pallet jacks, the legs, or "forks", of the pallet jack extend for 36 inches or more to position rollers at the extreme ends of such legs well toward the rear of the pallet to be raised. The length of such legs or "forks" generally exceeds the distance separating the outermost edges of the legs or "forks". In contrast, in the preferred embodiment of the present invention, the distance between the outer sides, or outermost edges, of the first and second legs is actually greater than the length of each of the first and second legs. Once again, this helps to ensure that the insertion of the legs into the catalyst bin base will not risk any damage to the discharge nozzle that extends through the center of the catalyst bin base.

As noted above, the catalyst bin base typically includes a pair of spaced forklift ports, or "pockets", for receiving the forks of a conventional forklift. In the preferred embodiment of the present invention, the first and second legs of the lifting jack are close enough to each other that they can be inserted into the catalyst bin base within the space lying between the spaced forklift ports.

As described above, the apparatus of the present invention includes first and second idler roller assemblies for supporting one end of the catalyst bin base during movement. Once the catalyst bin has been positioned into a desired location, e.g., in a designated spot on the floor of a truck trailer, the end of the catalyst bin base into which the first and second idler roller assemblies were inserted is temporarily raised, as by using the lifting jack, to remove the weight of the load from the first and second idler roller assemblies, which are then removed. The catalyst bin base is lowered back down to rest directly upon the supporting surface, e.g., the floor of the truck trailer, until the truck trailer is transported to a final destination. The lifting jack preferably includes first and second retainers for releasably storing the first and second idler roller assemblies upon the lifting jack when not in use.

Another aspect of the present invention provides a method of supporting a catalyst bin for movement in relatively close quarters. In practicing such method, the first end of the catalyst bin base is raised above the support surface, and first and second idler rollers are inserted between the support surface and the catalyst bin base near the opposing sides of the first end of the catalyst bin base. The first end of the catalyst container base is then lowered so that it rests upon the first and second idler rollers, which in turn, rest upon the support surface. The method also includes the step of providing a lifting jack having a pair of legs each shorter in length than the distance from either end of the catalyst bin base to the central discharge hopper. Each of the legs of the lifting jack includes a roller for rolling upon the support surface. The lifting jack also includes at least one load-bearing surface for engaging the catalyst bin base, and the lifting jack is adapted to selectively raise or lower such load-bearing surface. The first and second legs of the lifting jack are inserted within the second end of the catalyst bin base, and the lifting jack is operated to raise the load-bearing surface to lift the second end of the catalyst bin base. The operator then exerts a lateral force on the lifting jack to roll the catalyst bin in a desired direction.

Once the catalyst bin has been moved into a desired position, for example, on the bed of a truck trailer, the aforementioned method preferably includes additional steps to lower the base of the catalyst bin directly onto the supporting surface. In this regard, the lifting jack is operated to lower the load-bearing surface, and to lower the second end of the catalyst bin base to rest upon the support surface. The first and second legs of the lifting jack are then removed from the second end of the catalyst bin base, and are instead inserted into the first end of the catalyst bin base. The lifting jack is then operated to raise the load-bearing surface to lift the first end of the catalyst bin base above the support surface, thereby unloading the first and second idler rollers. The first and second idler rollers are then removed from the first end of the catalyst bin base, and the lifting jack is operated to lower the load-bearing surface in order to lower the first end of the catalyst bin base to rest upon the support surface. The first and second legs of the lifting jack may then be removed from the first end of the catalyst bin base. If desired, the first and second idler rollers may then be stored on the lifting jack until it is again desired to move the catalyst bin relative to its supporting surface.

In practicing the aforementioned method, the step of raising the first end of the catalyst bin base above the support surface, in order to insert the first and second idler rollers, may include the further steps of inserting the first and second legs of the lifting jack within the first end of the catalyst container base, and operating the lifting jack to raise the load-bearing surface to lift the first end of the catalyst bin base above the support surface.

Preferably, the aforementioned method includes the further step of rotatably supporting the load-bearing surface relative to the pair of legs of the lifting jack for allowing the lifting jack to be rotated about a vertical axis relative to the load-bearing surface.

BRIEF DESCRIPTION OF THE DRAWINGS

FIG. 3 is a bottom perspective view showing the underside of the idler roller of FIG. 2.

FIG. 4 is a partial side view of the catalyst bin after idler rollers have been inserted to rollingly support one end of the catalyst bin.

DETAILED DESCRIPTION OF THE PREFERRED EMBODIMENT

Figure 1:
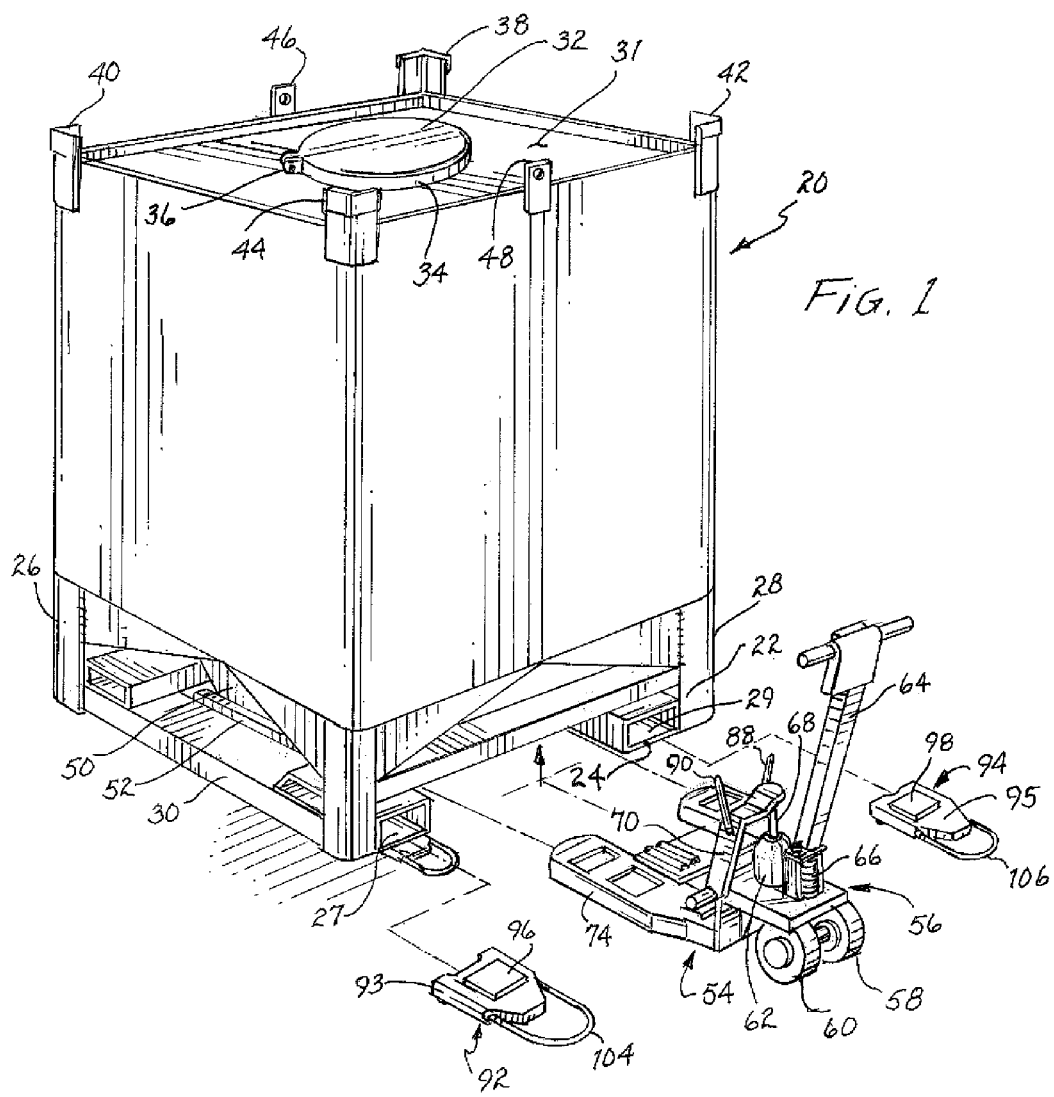
FIG. 1 is a perspective view of a typical catalyst bin, together with a lifting jack and a pair of idler rollers constructed in accordance with a preferred embodiment of the present invention.

A typical catalyst bin, of the type used to haul spent catalyst beads in the oil fracking industry, is shown in FIG. 1, and is designated generally by reference numeral 20. Catalyst bin 20 is conventionally made of heavy gauge steel construction, and includes base 22 which extends between first end 24 and second, opposing end 26. Base 22 also includes first and second opposing sides 28 and 30, respectively. A pair of fork lift ports, or pockets, 27 and 29, are provided within base 22, extending along opposing sides 28 and 30, respectively, and extend fully through base 22 to opposing end 26; pockets 27 and 29 are adapted to receive the forks of a conventional fork lift for raising and moving catalyst bin 20 where circumstances permit.

Still referring to FIG. 1, the top 31 of catalyst bin 20 includes a filler opening (not visible) for loading material into the catalyst container. The filler opening is shown sealed by a cover 32 that is removably secured over the filler opening by a collar 34 secured by clamp screw 36. Top 31 of catalyst bin 20 may also include alignment tabs 38, 40, 42 and 44 to facilitate the stacking of a second such catalyst bin atop catalyst bin 20. In addition, a pair of apertured opposing lift tabs 46 and 48 may also be welded to opposing sides of top 31 to facilitate lifting of catalyst bin 20 by a crane or overhead hook, if desired.

Visible near the bottom of FIG. 1 is discharge hopper outlet 50 within base 22 for selectively discharging material stored in catalyst container downwardly through base 22. A conventional slide plate 52 may be used to either seal, or expose, hopper outlet 50. For example, slide plate 52 is closed before catalyst bin 20 is filled with spent catalyst beads. After catalyst bin 20 is trucked to a catalyst reclamation facility, slide plate 52 can be opened to discharge the spent catalyst. It is important to note that the hopper outlet 50 may lie as close as inches to the first and second ends 24 and 26 of base 22. Were the forks of a forklift, or the legs of a conventional pallet jack, to be forcibly pushed into the space between fork entry pockets 27 and 29 sufficiently far to contact hopper outlet 50 (or its associated slide plate 52), catalyst bin 20 could develop a dangerous leak that would allow contaminated catalyst beads to be discharged therefrom.

Figure 5:
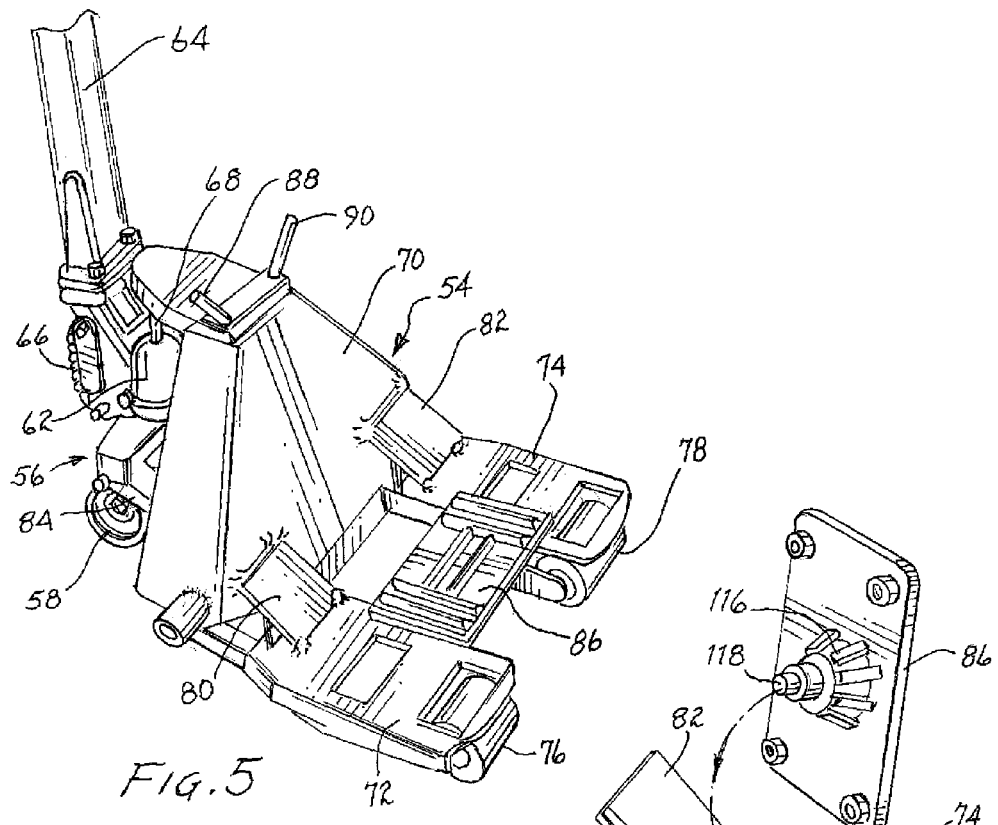
FIG. 5 is a partial perspective view of the lifting jack constructed in accordance with a preferred embodiment of the present invention.

Referring jointly to FIGS. 1 and 5, lifting jack 54 is shown in accordance with a preferred embodiment of the present invention. The purpose of lifting jack 54, along with a pair of associated idler roller assemblies 92 and 94, is to facilitate movement of catalyst bin 20 within confined spaces, e.g., on the bed of a truck trailer, where a forklift would not have sufficient room to operate normally. Lifting jack 54 includes a wheeled truck 56 including a pair of coaxial truck wheels 58 and 60. A hydraulic jack 62 is supported by wheeled truck 56, and may be pumped, or actuated, by handle 64 which is pivotally mounted to wheeled truck 56. Return spring 66 assists in raising handle 64 each time it is pushed down by a user. A piston rod 68 extends from the upper portion of hydraulic jack 62. Handle 64 not only serves to actuate hydraulic jack 62, but may also be used to steer movement of lifting jack 54, as well as a catalyst bin engaged by lifting jack 54.

Lifting jack 54 also includes a lift frame 70 operatively coupled to wheeled truck 56 and piston rod 68 of hydraulic jack 62 in order to lift an end of the catalyst bin base. Lift frame 70 includes a first shortened leg 72 and a second shortened leg 74. Legs 72 and 74 are spaced from each other; in the preferred embodiment, the center-to-center distance from leg 72 to leg 74 is approximately 14 inches; the inner sides of leg 72 and leg 74 are separated from each other by approximately 8.5 inches; and the outer sides of leg 72 and leg 74 are separated from each other by approximately 19.5 inches.

Legs 72 and 74 are significantly shorter than the legs, or forks, commonly found on a conventional pallet jack. In the preferred embodiment, the length of each of legs 72 and 74 does not exceed 12 inches, thereby insuring that neither of such legs can impact discharge hopper 50 or slide plate 52. Legs 72 and 74 include load rollers 76 and 78, respectively, for providing rolling support of a load upon a support surface; each of such load rollers is pivotally mounted to its associated leg by a lever arm whereby each load roller can be forcibly rotated downwardly away from its associated leg. A pair of stop plates 80 and 82 are also preferably welded to lift frame 70 proximate the forward most ends of legs 72 and 74, respectively; stop plates 80 and 82 help insure that legs 72 and 74 can not be inserted into base 22 of catalyst bin 20 far enough to contact hopper discharge outlet 50 or slide plate 52.

Figure 7:
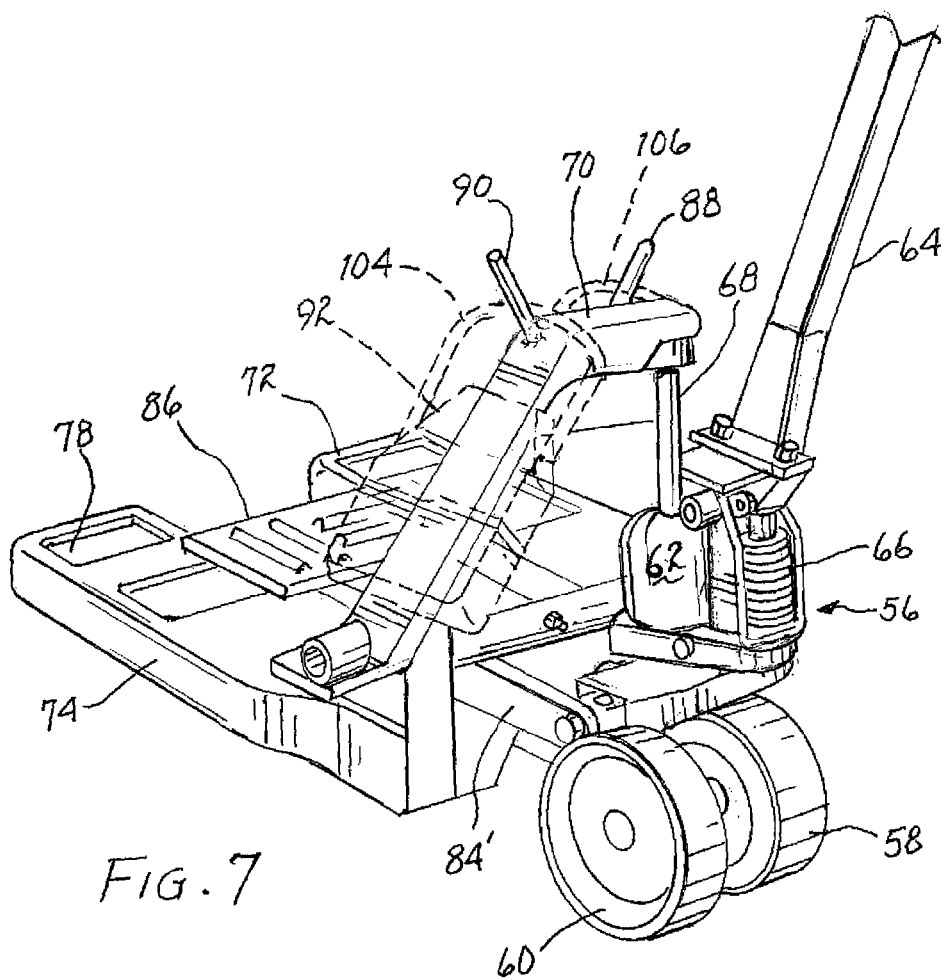
FIG. 7 is another perspective view of the lifting jack viewed from the truck end thereof.
Figure 8:
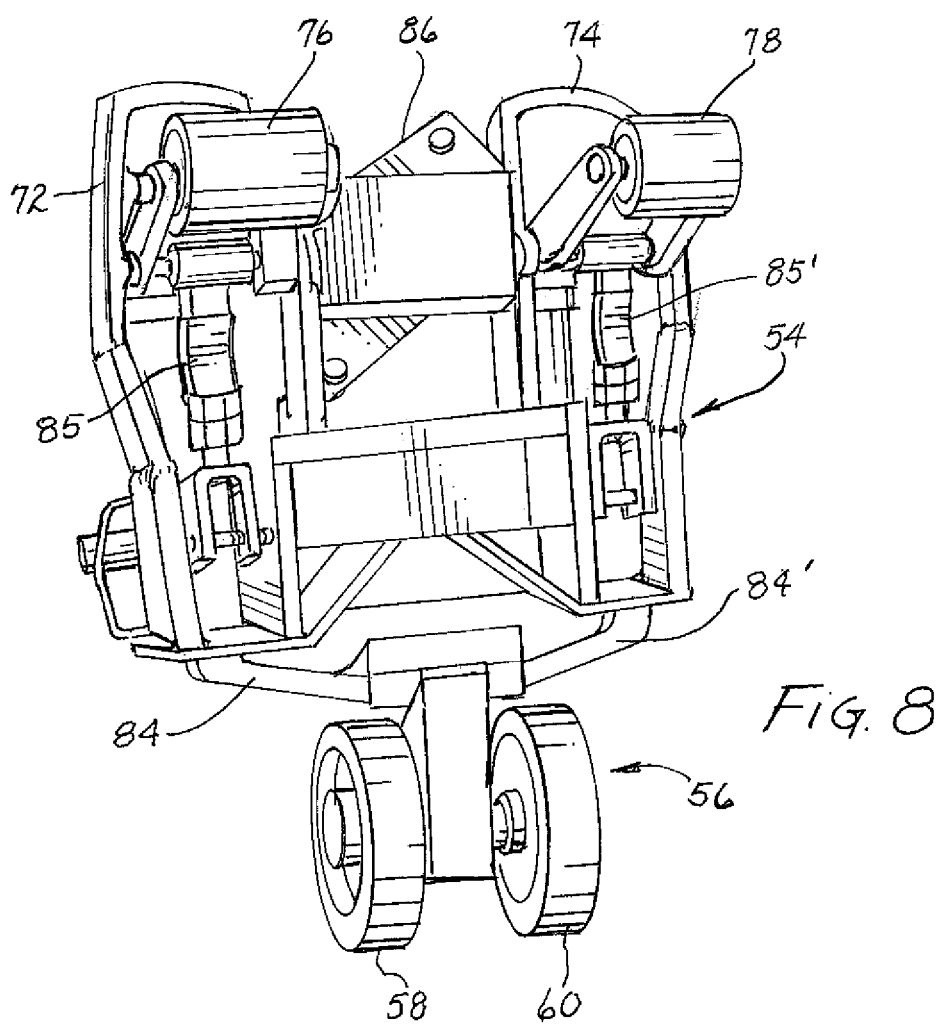
FIG. 8 is a perspective view of the underside of the lifting jack.

As the operator pumps handle 64 up and down, hydraulic jack 62 forces piston rod 68 upwardly, causing the entire lift frame 70 to rise. A linkage extends along each side of wheeled truck 56 to the legs 72 and 74 of lift frame 70; in FIG. 5, the linkage leading to leg 72 is designated by reference numeral 84. Referring briefly to FIGS. 7 and 8, the linkage leading to leg 74 is designated by reference numeral 84'. As piston rod 68 raises lift frame 70, linkages 84 and 84' cause rollers 76 and 78 to be rotated downwardly relative to legs 72 and 74, thereby supporting legs 72 and 74 in a raised position. Conversely, as the pressure within hydraulic jack 62 is released, piston rod 68 lowers, lift frame 70 also lowers, and linkages 84 and 84' cause rollers 76 and 78 to retract back into legs 72 and 74.

Referring briefly to FIG. 8, the underside of lifting jack 54 is visible. As lifting jack 54 is raised by pumping action applied by an operator, linkages 84 and 84' rotate, and pull on tension rods 85 and 85', respectively, causing rollers 76 and 78 to be pivoted downwardly away from legs 72 and 74.

As shown best in FIG. 5, a load bearing plate 86 is supported midway between legs 72 and 74. The specific manner in which load plate 86 is supported will be described in greater detail below. It should be clear that as lift frame 70, and legs 72 and 74, are elevated by the actuation of hydraulic jack 62, load plate 86 is also elevated. Load plate 86 extends slightly higher than legs 72 and 74. Thus, when legs 72 and 74 are inserted into either first end 24, or second end 26, of base 22 of catalyst bin 20, it is load plate 86 that engages and lifts the respective end of catalyst bin base 22.

Also visible within FIG. 5 are a pair of retainer arms 88 and 90. As will become more apparent as this description proceeds, retainer arms 88 and 90 may be used to removably store idler roller assemblies 92 and 94 when they are not in use.

Figure 2:
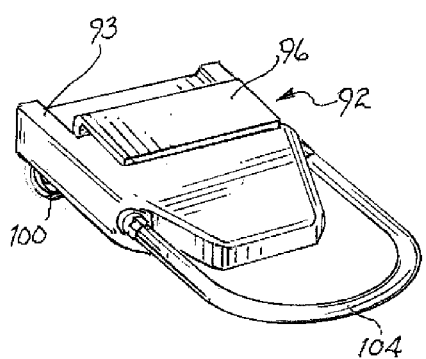
FIG. 2 is a top perspective view of an idler roller constructed in accordance with a preferred embodiment of the present invention.

Referring now to FIGS. 1-3, a pair of idler roller assemblies 92 and 94 are shown. As shown best in FIGS. 2 and 3, first idler roller assembly 92 includes a support frame 93 including an upper plate 96 for engaging base 22 of catalyst bin 20. A load roller 100 is rotationally housed within support frame 93. Similarly, second idler roller assembly 94 includes a support frame 95 including an upper plate 98 for engaging base 22 of catalyst bin 20, and a similar load roller rotationally housed within support frame 95. While not limited thereto, one method of providing idler roller assemblies 92 and 94 is to simply cut off the forward most ends of the forks from a conventional pallet jack. Load roller 100 within first idler roller assembly 92, and the corresponding load roller within second idler roller assembly 94, need not be pivoted, raised, and/or lowered, since first and second idler roller assemblies 92 and 94 merely serve to rollably support one end of catalyst bin 20 during those times when it is desired to move catalyst bin 20. In this regard, FIG. 4 illustrates first idler roller assembly 92 having been inserted below base 22 under first end 24 of catalyst bin 20. In order to insert first idler roller assembly 92 under base 22, first end 24 of catalyst bin 20 is temporarily raised above supporting surface 101, either by a forklift (as when catalyst bin 20 is initially lifted onto the end of a truck trailer) or by lifting jack 54.

Once first and second idler roller assemblies 92 and 94 have been inserted below first end 24 of base 22 of catalyst bin 20 proximate the first and second opposing sides thereof, in the manner illustrated in FIG. 4, the legs 72 and 74 of lifting jack 54 may be advanced into opposing end 26 of base 22 of catalyst bin 20, as indicated in FIG. 4. Lifting jack 54 is then raised to lift second end 26 of catalyst bin 20 for rolling support upon rollers 76 and 78, thereby allowing an operator to move catalyst bin 20 in a desired direction.

A U-shaped hanger bracket 104 is preferably welded to the front of idler roller assembly 92; likewise, a U-shaped hanger bracket 106 is preferably welded to the front of idler roller assembly 94. Hanger brackets 104 and 106 serve as helpful handles when positioning idler rollers 92 and 94 below catalyst bin base 22, or when removing idler rollers 92 and 94 from below catalyst bin base 22. Hanger brackets 104 and 106 also provide a convenient way to hang idler rollers 92 and 94 from retainers 88 and 90 when idler rollers 92 and 94 are not in use, as indicated by the dashed lines in FIG. 7.

Figure 6:
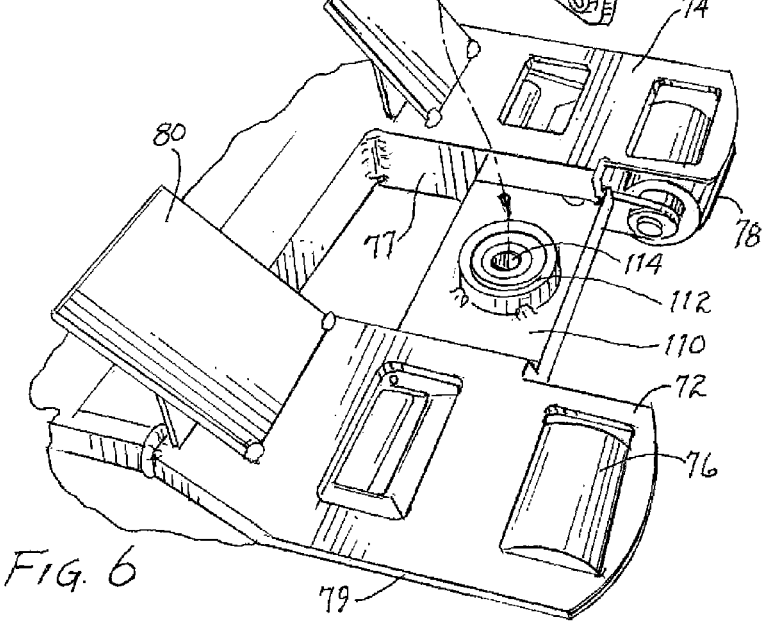
FIG. 6 is a more-detailed perspective view of the load bearing end of the lifting jack, and illustrating the manner in which a load plate is rotatably supported by a support plate.

Referring now to FIGS. 5 and 6, horizontal load plate 86 serves as a load-bearing surface of lifting jack 54 for engaging the underside of either end of base 22 of catalyst bin 20. The present inventor has found it to be advantageous to rotatably support load plate 86 from lift frame 70 for allowing lift frame 70 to be rotated relative to load plate 86 and the load that it supports, i.e., one of the ends 24 or 26) of base 22 of catalyst bin 20. To this end, a generally horizontal support plate 110 extends between first leg 72 and second leg 74 of lift frame 70. Preferably, support plate 110 is welded at its ends to the inner vertical faces of legs 72 and 74. A bearing assembly 112 has a fixed outer race that is welded to the upper face of support plate 110. A freely-rotatable inner race of bearing 112 has a circular passageway 114 formed therein. The underside of support plate 86 has a downwardly extending tapered boss 116 welded thereto, terminating in a stub shaft 118 that fits within circular passageway 114 of bearing 112. As a result, support plate 86 extends to a height above both legs 72 and 74, and is free to rotate within bearing 112. In this manner, lifting jack 54 can lifting an end of catalyst bin base 22 while allowing lifting jack 54 to be rotated about the vertical axis that passes through bearing 112, relative to load plate 86 and catalyst bin 20. This feature allows an operator to more easily steer the catalyst bin into a desired position by turning lifting jack 54 to face a desired direction before pushing, or pulling, on lifting jack 54 to move catalyst bin 20.

Lifting jack 54 differs from pallet jacks known to the inventor in that first and second legs 72 and 74 are relatively short when compared to the spacing between such legs. For example, in the preferred embodiment, the center-to-center distance between the first leg 72 and the second leg 74 is approximately 14.5 inches, comparable to the center-to-center distance separating the legs of a conventional pallet jack. Likewise, the distance between the outer face 79 of first leg 72 and the outer face of second leg 74 is approximately 19.5 inches, again comparable to the distance between the outer faces of the legs of a conventional pallet jack. However, the length of each of the first and second legs that can actually extend into base 22 of catalyst bin 20 is less than 12 inches, which is less than the distance between the outer face 79 of first leg 72 and the outer face of second leg 74, and also less than the center-to-center distance between legs 72 and 74.

As mentioned earlier, base 22 of catalyst bin 20 includes fork lift port, or "pockets", 27 and 29 for receiving left and right forks of a conventional forklift. The typical center-to-center distance between the fork lift ports formed in the base of a catalyst bin is approximately 40 inches. The legs 72 and 74 of lifting jack 54 easily fit between fork lift ports 27 and 29 within base 22 of catalyst bin 20 for lifting one end of catalyst bin 20. However, legs 72 and 74 are short enough to avoid any damaging contact with the discharge hopper 50, or slide plate 52, extending through base 22 of catalyst bin 20.

It will be recalled that another feature of the present invention relates to a method of supporting a catalyst bin for movement in relatively close quarters. FIGS. 9A-9F serve to illustrate one preferred method for accomplishing this goal.

Figure 9A:
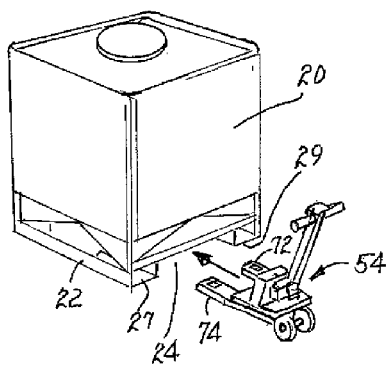
FIG. 9A is a simplified perspective drawing showing a lifting jack being inserted into a first end of the base of a catalyst bin.

In FIG. 9A, base 22 of catalyst bin 20 rests directly upon a support surface (not shown). Lifting jack 54 is advanced toward first end 24 of base 22 for inserting legs 72 and 74 within first end 24.

Figure 9D:
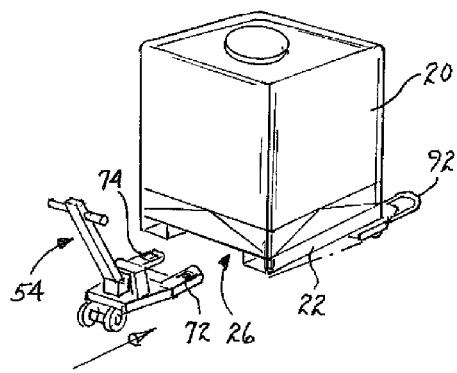
FIG. 9D is a simplified perspective drawing showing the lifting jack being inserted into the second end of the base of the catalyst bin.
Figure 9B:
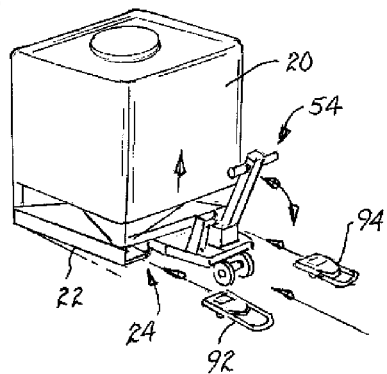
FIG. 9B is a simplified perspective drawing showing the lifting jack being raised to insert a pair of idler roller assemblies.

In FIG. 9B, an operator pumps the handle of lifting jack 54 to raise first end 24 of base 22 of catalyst bin 20 to a sufficient height to insert idler roller assemblies 92 and 94 below first end 24 of base 22. Idler roller assembly 92 is rolled below forklift pocket 27, and idler roller assembly 94 is rolled below forklift pocket 29.

Figure 9E:
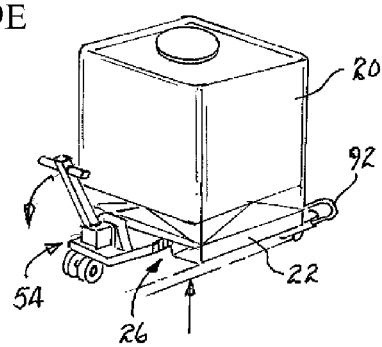
FIG. 9E is a simplified perspective drawing showing the lifting jack being raised to elevate the second end of the base of the catalyst bin.
Figure 9C:
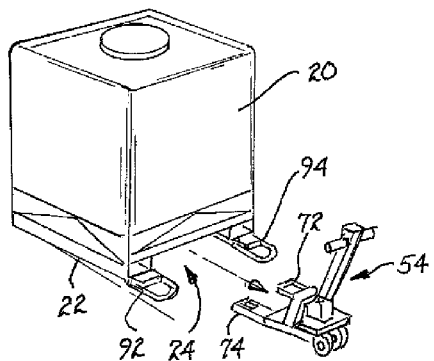
FIG. 9C is a simplified perspective drawing showing the lifting jack being removed after the idler roller assemblies are inserted.

In FIG. 9C, lifting jack 54 has been fully lowered, allowing the weight of first end 24 of base 22 of catalyst bin 20 to be borne by idler roller assemblies 92 and 94. Lifting jack 54 is pulled outwardly from first end 24 of base 22.

Advancing to FIG. 9D, an operator has moved lifting jack 54 to opposite end 26 of base 22 of catalyst bin 20. The operator advances legs 72 and 74 inwardly into second end 26 of base 22.

In FIG. 9E, the operator pumps the handle of lifting jack 54 a sufficient number of times to elevate second end 26 of catalyst bin 20 above the support surface. The weight of second end 26 of catalyst bin 20 is now borne by rollers 76 and 78 of legs 72 and 64, and to a lesser extent by truck wheels 58 and 60.

Figure 9F:
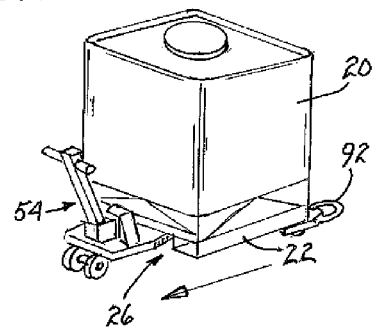
FIG. 9F is a simplified perspective drawing showing the lifting jack being used to move the catalyst bin.

Finally, in FIG. 9F, an operator pulls on, pushes on, otherwise applies a lateral force to the handle of lifting jack 54 in a desired direction to move catalyst bin 20 into a desired position. For example, catalyst bin 20 might be moved into a forward most portion of a truck trailer that is going to be used to transport spent catalyst beads from an oil fracking site to a spent catalyst bead treatment facility.

Once catalyst bin 20 is moved to a desired location on the truck trailer, the steps shown in FIGS. 9A-9F may be reversed to once again lower catalyst bin 20 directly onto the floor of the truck trailer. Idler roller assemblies 92 and 94 may then be stowed upon lifting jack 54, in the manner described above, until lifting jack 54 is to be used again.

Variations of the above-described method may also be practiced. For example, while FIGS. 9A-9C illustrate the use of lifting jack 54 itself to raise first end 24 of catalyst bin 20, those skilled in the art will appreciate that one could instead use a conventional forklift to raise catalyst bin 20 above the floor of a truck trailer. This will often occur when a forklift is being used to lift catalyst bins upwardly onto the rear end of a truck trailer. It will be appreciated that the forklift operator could temporarily maintain catalyst bin 20 a few inches above the floor of the truck trailer while an assistant inserts idler roller assemblies 92 and 94 in place below first end 24 of base 22 of catalyst bin 20; the forklift operator would then lower catalyst bin 20 fully down, allowing first end 24 of catalyst bin 20 to rest upon idler roller assemblies 92 and 94. Thereafter, the steps shown in FIGS. 9D-9F would be performed to allow lifting jack 54 to be used to move catalyst bin 20 to a desired location.

Those skilled in the art will now appreciate that a simple and inexpensive apparatus has been described for efficiently moving and/or placing catalyst bins within tight quarters. The disclosed apparatus may easily be operated by a single operator, even when moving fully-loaded catalyst bins. The disclosed apparatus reliably moves catalyst bins within tight quarters, while avoiding the risk of damage to the discharge hopper of the catalyst bin, or to its associated slide plate. In addition, the use of bearing 112 to couple load plate 86 to support plate 110 allows catalyst bin 20 toward a desired position during movement of the catalyst bin. Those skilled in the art will also appreciates that the apparatus described herein for moving catalyst bins is not very expensive, but is generally easy to practice and manufacture.

While the present invention has been described with respect to preferred embodiments thereof, such description is for illustrative purposes only, and is not to be construed as limiting the scope of the invention. Various modifications and changes may be made to the described embodiments by those skilled in the art without departing from the true spirit and scope of the invention as defined by the appended claims.

I claim:

1. An apparatus for moving catalyst containers in relatively close quarters, the catalyst containers having a base extending between first and second opposing ends and having first and second opposing sides, an uppermost opening for loading material into the catalyst container, a hopper outlet for discharging material stored in the catalyst container downwardly through the base, the hopper being spaced from the first and second opposing ends of the base by a first predetermined distance, said apparatus comprising in combination:
   a lifting jack including first and second legs spaced from each other for extending into the base of a catalyst container, each of the first and second legs having a length shorter than the first predetermined distance to avoid contact with the hopper, each of said first and second legs pivotally supporting a load roller associated therewith, the lifting jack including a load-bearing surface for engaging an end of the catalyst container base, the lifting jack selectively raising or lowering the load-bearing surface;
   first and second idler roller assemblies, the first and second idler roller assemblies each including a support frame for engaging the base of the catalyst container and including a load roller rotationally housed within its support frame;
   whereby the first and second idler roller assemblies may be inserted below the first end of the catalyst container base proximate the first and second sides thereof, respectively, and the first and second legs of the lifting jack may be inserted within the second end of the catalyst container base, and the lifting jack may be actuated to raise the load-bearing surface for raising the second end of catalyst container base, and for allowing the catalyst container to be moved.

2. The apparatus recited by claim 1 wherein the lifting jack includes:
   a) a wheeled truck;
   b) a hydraulic jack supported by the wheeled truck;
   c) a handle pivotally mounted to the wheeled truck for actuating the hydraulic jack and for steering movement of the lifting jack;
   iv) a lift frame operatively coupled to the wheeled truck and hydraulic jack for lifting an end of the catalyst container base;
   wherein the first and second legs of the lifting jack and the load-bearing surface are included within the lift frame; and
   wherein the lift frame is selectively raised or lowered as the hydraulic jack is operated.

3. The apparatus recited by claim 2 wherein the first and second legs of the lift frame are raised relative to their respective load rollers as the hydraulic jack is actuated.

4. The apparatus recited by claim 1 wherein the load-bearing surface of the lifting jack includes a generally horizontal load plate.

5. The apparatus recited by claim 4 further including a generally horizontal support plate extending between the first and second legs of the lifting jack, and a bearing supported by the horizontal support plate, and wherein the generally horizontal load plate is rotatably supported by the bearing for lifting an end of the catalyst container base while allowing the lifting jack to rotate about a vertical axis relative to the horizontal load plate and the catalyst container base.

6. The apparatus recited by claim 1 wherein:
   a) the first leg of the lifting jack has an inner side facing the second leg and an opposing outer side;
   b) the second leg of the lifting jack has an inner side facing the first leg and an opposing outer side; and
   c) the distance between the outer sides of the first and second legs is greater than the length of each of the first and second legs.

7. The apparatus recited by claim 1 wherein the catalyst container base includes a pair of spaced forklift ports for receiving the forks of a conventional forklift, and wherein the first and second legs of the lifting jack can be inserted into the catalyst container base within a space lying between the spaced forklift ports.

8. The apparatus recited by claim 1 wherein the lifting jack includes first and second retainers for releasably storing the first and second idler roller assemblies when not in use.

9. A method of supporting a catalyst container for movement in relatively close quarters, the catalyst container having a base extending between first and second opposing ends and having first and second opposing sides, an uppermost opening for loading material into the catalyst container, a hopper outlet for discharging material stored in the catalyst container downwardly through the base, the hopper being spaced from the first and second opposing ends of the base by a first predetermined distance, the method comprising the steps of:
   a) raising a first end of the catalyst container base above a support surface;
   b) inserting a first idler roller between the support surface and the catalyst container base proximate a first side of the first end of the catalyst container base;
   c) inserting a second idler roller between the support surface and the catalyst container base proximate a second side of the first end of the catalyst container base;
   d) lowering the first end of the catalyst container base so that it rests upon the first and second idler rollers;
   e) providing a lifting jack having a pair of legs each shorter in length than the first predetermined distance, each of such legs including a roller for rolling upon the support surface, the lifting jack including at least one load-bearing surface for engaging the catalyst container base, and the lifting jack being adapted to selectively raise or lower the load-bearing surface;
   f) inserting the first and second legs of the lifting jack within the second end of the catalyst container base;
   g) operating the lifting jack to raise the load-bearing surface to lift the second end of the catalyst container base; and
   h) exerting lateral force on the lifting jack to roll the catalyst container in a desired direction.

10. The method of supporting a catalyst container for movement as recited by claim 9 wherein the step of raising a first end of the catalyst container base above the support surface includes the steps of:
    a) inserting the first and second legs of the lifting jack within the first end of the catalyst container base; and b) operating the lifting jack to raise the load-bearing surface to lift the first end of the catalyst container base above the support surface.

11. The method of supporting a catalyst container for movement as recited by claim 9 including the further step of rotatably supporting the load-bearing surface relative to the pair of legs of the lifting jack for allowing the lifting jack to be rotated about a vertical axis relative to the load-bearing surface.

12. The method of supporting a catalyst container for movement as recited by claim 9 further including the steps of:
   a) positioning the catalyst container in a desired position;
   b) operating the lifting jack to lower the load-bearing surface to lower the second end of the catalyst container base to rest upon the support surface;
   c) removing the first and second legs of the lifting jack from the second end of the catalyst container base;
   d) inserting the first and second legs of the lifting jack within the first end of the catalyst container base;
   e) operating the lifting jack to raise the load-bearing surface to lift the first end of the catalyst container base above the support surface;
   f) removing the first idler roller from the first end of the catalyst container base;
   g) removing the second idler roller from the first end of the catalyst container base;
   h) operating the lifting jack to lower the load-bearing surface to lower the first end of the catalyst container base to rest upon the support surface; and
   i) removing the first and second legs of the lifting jack from the first end of the catalyst container base.

* * * * *